United States Patent
Ohkouchi et al.

(10) Patent No.: US 7,012,401 B2
(45) Date of Patent: Mar. 14, 2006

(54) INVERTER SYSTEM OF AUTOMOTIVE MOTOR

(75) Inventors: Yasuyuki Ohkouchi, Kariya (JP); Kenji Funahashi, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/825,295

(22) Filed: Apr. 16, 2004

(65) Prior Publication Data

US 2004/0222767 A1 Nov. 11, 2004

(30) Foreign Application Priority Data

May 8, 2003 (JP) .................................... 2003-130290

(51) Int. Cl.
*H02P 5/34* (2006.01)

(52) U.S. Cl. ...................................... 318/801; 318/805
(58) Field of Classification Search ................ 318/801, 318/567, 564, 805, 812, 822, 139; 324/509; 361/93.1

See application file for complete search history.

(56) References Cited

U.S. PATENT DOCUMENTS

| 5,963,442 A | 10/1999 | Yoshida et al. |
| 2002/0012216 A1 * | 1/2002 | Ohshima .................. 361/93.1 |
| 2002/0121902 A1 * | 9/2002 | Suzuki ....................... 324/509 |
| 2003/0136597 A1 * | 7/2003 | Raftari et al. ............... 180/242 |

FOREIGN PATENT DOCUMENTS

JP    A 11-189032    7/1999

* cited by examiner

*Primary Examiner*—Karen Masih
(74) *Attorney, Agent, or Firm*—Oliff & Berridge, PLC

(57) ABSTRACT

An inverter includes an upper ECU, a communication microcomputer receiving an instruction from the upper ECU, a motor control microcomputer receiving an instruction from the communication microcomputer, a gate driving circuit controlled by the motor control microcomputer, and a switching element driven by the gate driving circuit for converting a direct current of a high-voltage battery into an alternating current to drive a motor. The communications between the upper ECU and the communication microcomputer is performed according to a CAN protocol. The communications between the communication microcomputer and the motor control microcomputer is performed according to a low-speed serial communication protocol. An insulation boundary is defined between the communication microcomputer and the motor control microcomputer to isolate a low-voltage side electric component receiving electric power of the low-voltage battery from a high-voltage side electric component receiving electric power of the high-voltage battery. And, a photo coupler is disposed on the insulation boundary to assure insulation and transmit signals.

9 Claims, 2 Drawing Sheets (COMPARATIVE EXAMPLE)

INVERTER SYSTEM OF AUTOMOTIVE MOTOR

BACKGROUND OF THE INVENTION

The present invention relates to an inverter system which is, for example, used to drive and control a motor equipped in an electrically-driven compressor for an automotive vehicle.

An electric vehicle or a hybrid vehicle is generally equipped with two kinds of electric power sources, one of which is a low-voltage battery similar to that used in a gasoline vehicle and the other is a high-voltage battery insulated from the low-voltage battery. According to these automotive vehicles, an inverter system including an inverter operating under electric power supply of the high-voltage battery is provided for controlling a drive motor of the vehicle or a motor equipped in an electrically-driven compressor.

For example, the Japanese Patent Application Laid-open No. 11-189032(1999) corresponding to the U.S. Pat. No. 5,963,442 discloses an inverter system including an inverter 100 operating under electric power supply of a high-voltage battery 109 and an air-conditioning control section 104 operating under electric power supply of a low-voltage battery (not shown). An insulating communication circuit including a photo coupler 105 is provided on an insulation boundary between the air-conditioning control section 104 and the inverter 100. The photo coupler 105 has a function of insulating a low-voltage side electric component (such as the air-conditioning control section 104) from a high-voltage side electric component (such as a motor 106 or a switching element 107). Furthermore, the photo coupler 105 has a function of assuring communications between the air-conditioning control section 104 and the inverter 100. The communication protocol used for these communications is, for example, LIN (Local Interconnect Network) or other relatively low-speed communication protocol.

However, advanced automotive vehicles employ CAN (Controller Area Network) or other relatively higher-speed communication protocol, for example, for LAN communications between various ECUs (Electronic Control Units) installed in the vehicle.

According to the photo coupler 105 used in the above-described conventional inverter system, it is difficult to execute high-speed signal transmission between the air-conditioning control section 104 and the inverter 100. In this respect, as shown in FIG. 2, if a microcomputer 101 of the inverter 100 (indicated by a dotted line) is disposed at the low-voltage side of the insulation boundary (indicated by an alternate long and short dash line), more specifically when the microcomputer 101 operates under electric power supply of the low-voltage battery (not shown), it will be possible to execute high-speed communications.

However, in this case, some electric components such as a voltage detecting section 102, a gate driving circuit 103, and a current detecting section 108 will be dissected by the insulation boundary. Accordingly, in each electric component, there will be necessary to provide a sufficient spatial distance or creepage distance for assuring insulation between the high-voltage side and the low-voltage side. Furthermore, required insulation parts or components will be expensive. Accordingly, the body size of the inverter 100 will become large. Furthermore, incorporating the low-voltage battery in the inverter 100 will complicate the wiring of the inverter 100.

SUMMARY OF THE INVENTION

In view of the above-described problems, the present invention has an object to provide an inverter system capable of solving the above-described problems. The inverter system of the present invention enables high-speed communications, downsizes the body size, and simplifies the wiring.

In order to accomplish the above and other related objects, the present invention provides an inverter system equipped with an inverter. The inverter includes an upper ECU operating under electric power supply of a low-voltage battery, a communication microcomputer receiving an instruction from the upper ECU, a motor control microcomputer receiving an instruction from the communication microcomputer, a gate driving circuit controlled by the motor control microcomputer, and a switching element driven by the gate driving circuit for converting a direct current of a high-voltage battery into an alternating current to drive a motor. According to the inverter system of the present invention, the upper ECU and the communication microcomputer are connected to each other via high-speed communication means to transmit instructions. The communication microcomputer and the motor control microcomputer are connected to each other via low-speed communication means to transmit instructions. An insulation boundary is defined between the communication microcomputer and the motor control microcomputer to isolate a low-voltage side electric component receiving electric power of the low-voltage battery from a high-voltage side electric component receiving electric power of the high-voltage battery. And, insulation signal transmitting means is disposed on the insulation boundary to assure insulation and transmit signals.

The inverter system of the present invention includes the communication microcomputer and the motor control microcomputer. In other words, the circuit arrangement of this invention is equivalent to separating the microcomputer 101 incorporating a communication circuit and a motor control circuit shown in FIG. 2 into two independent microcomputers. The insulation boundary is provided or defined between the communication microcomputer and the motor control microcomputer. Furthermore, the insulation signal transmitting means is disposed on the insulation boundary.

The communications between the upper ECU (corresponding to the air-conditioning control section shown in FIG. 2) and the communication microcomputer are performed via the high-speed communication means. On the other hand, the insulation signal transmitting means interposes between the communication microcomputer and the motor control microcomputer. The communications between the communication microcomputer and the motor control microcomputer are performed via the low-speed communication means having the communication speed lower than that of the high-speed communication means. In other words, the high-speed communication means is used in a limited region including the upper ECU and the communication microcomputer only. Accordingly, the insulation signal transmitting means needs not to possess high-speed communication capability. Thus, the inverter system of the present invention can effectively realize high-speed communications.

Furthermore, according to the inverter system of the present invention, almost all of the electric components of the inverter except for the communication microcomputer are disposed at the high-voltage side and accordingly driven or actuated under electric power supply of the high-voltage battery. Hence, the wiring of the inverter is simple compared with the circuit arrangement shown in FIG. 2 according to which numerous electric components are disposed at the low-voltage side.

Furthermore, the inverter system of the present invention includes no electric components dissected by the insulation boundary like the voltage detecting section 102, the gate driving circuit 103, and the current detecting section 108 shown in FIG. 2. Therefore, there is no necessity of providing a long spatial distance or creepage distance for assuring insulation. Furthermore, no expensive insulation components are required. Thus, the inverter system of the present invention realizes not only downsizing but also cost reduction.

In general, the use of the high-speed communication means or the low-speed communication means for communications between the upper ECU and the communication microcomputer is dependent on the type of each automotive vehicle. In this respect, according to the inverter system of the present invention, the electric components disposed at the high-voltage side of the insulation boundary can be commonly used for various kinds of automotive vehicles irrespective of communication means to be practically used. Accordingly, the inverter system of the present invention can reduce the manufacturing costs.

According to a preferable embodiment of the present invention, the motor of the inverter system drives an electrically-driven compressor for an automotive vehicle. In general, rapidness is not so important for the communications in the control for an automotive electrically-driven compressor. Accordingly, the high-speed communication means is not essential for the communications between the upper ECU and the communication microcomputer. Namely, the low-speed communication means may be used depending on the type of each automotive vehicle. Accordingly, when used for controlling an automotive electrically-driven compressor, the inverter system of the present invention brings the above-described merit that the electric components disposed at the high-voltage side of the insulation boundary can be commonly used.

According to the preferable embodiment of the present invention, the high-speed communication means has a communication speed exceeding 20 kbps. According to this arrangement, the communication speed of the high-speed communication means is set to be higher than 20 kbps that is the maximum communication speed of LIN. According to this arrangement, the high-speed communication means can execute communications based on any communication protocol having a communication speed higher than that of the LIN.

According to the preferable embodiment of the present invention, the high-speed communication means is a CAN protocol. The CAN is a communication protocol standardized according to ISO11898 (maximum communication speed: 1 Mbps) and ISO11519-2 (maximum communication speed: 125 kbps). For example, the European automotive industry prefers positively employing the CAN protocol for the LAN communications performed in an automotive vehicle. The arrangement of this invention can satisfy such requirements raised from the automotive industry. Furthermore, the electric components located at the high-voltage side of the insulation boundary of this inverter system can be used even in a regional area where the communication protocol (for example, LIN) having the communication speed slower than that of the CAN protocol. In this manner, the arrangement of this invention enables to commonly use the electric components located at the high-voltage side of the insulation boundary of the inverter system for various vehicles and under various situations.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

A preferred embodiment of the inverter system according to the present invention will be explained hereinafter with reference to attached drawings.

The inverter system of this embodiment serves as a driving system for a motor-driven compressor equipped in a hybrid vehicle.

Figure 1:
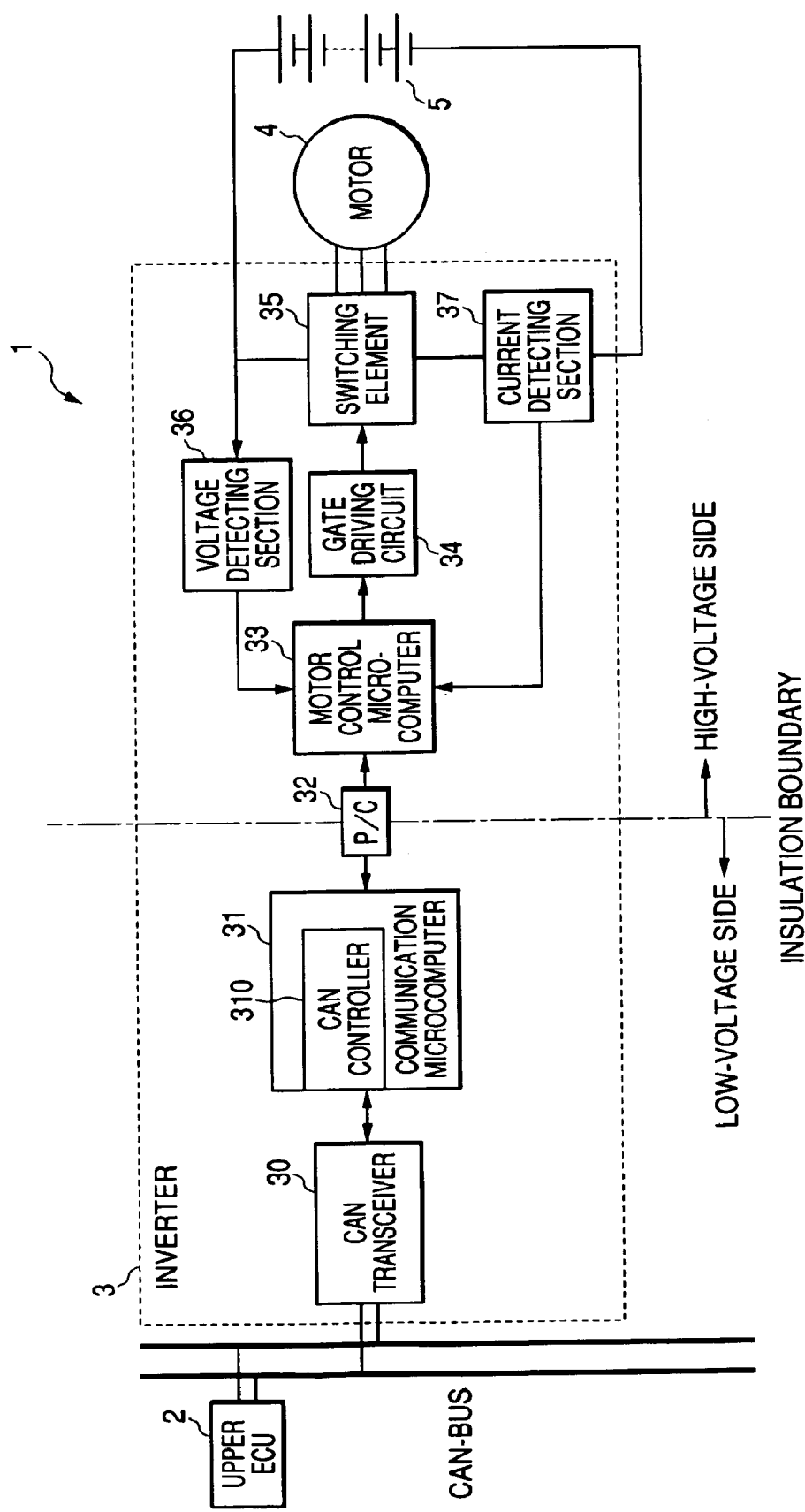
FIG. 1 is a circuit diagram showing an arrangement of an inverter system in accordance with a preferred embodiment of the present invention.
Figure 2:
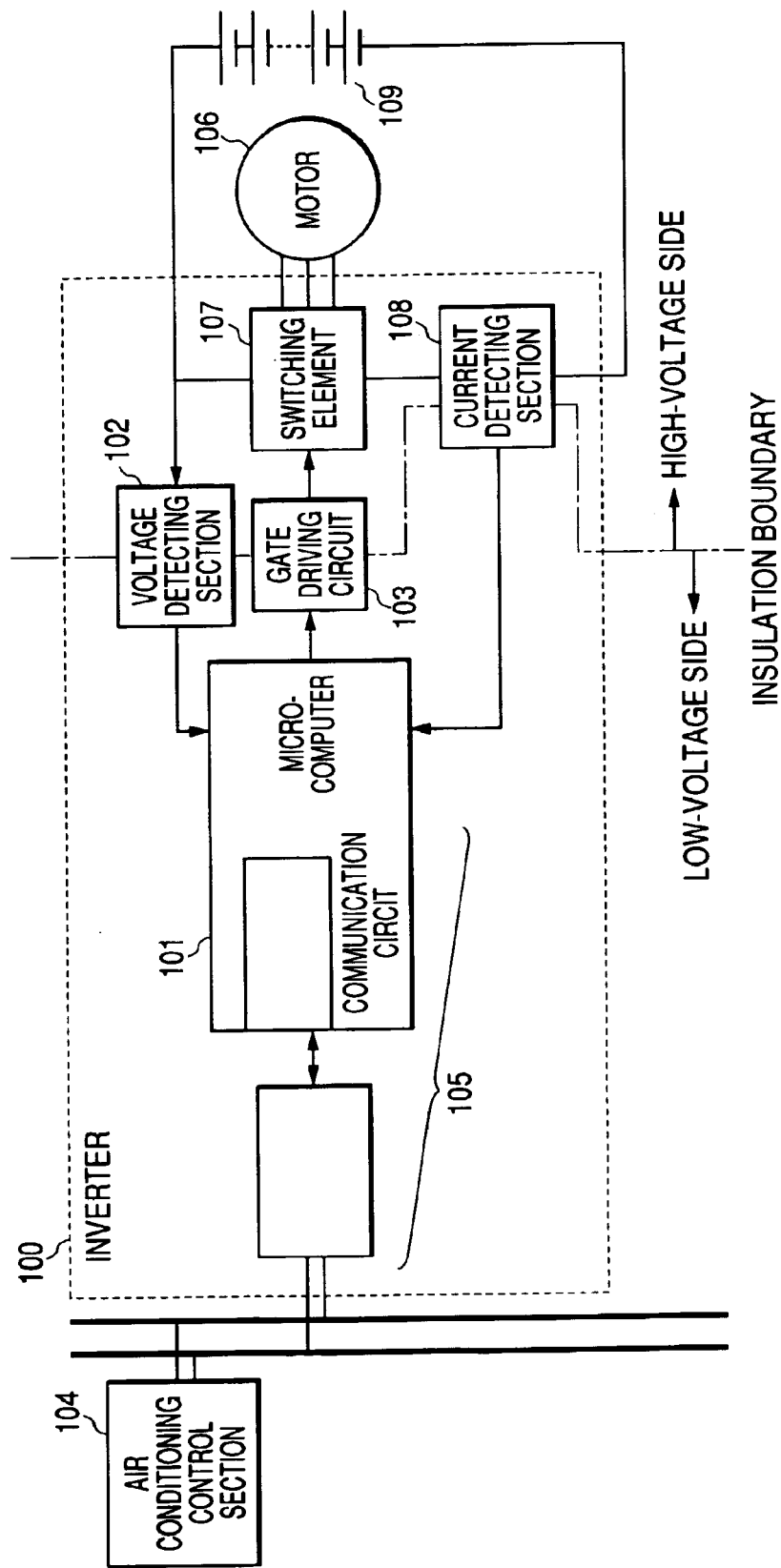
FIG. 2 is a circuit diagram showing a modified setting of an insulation boundary based on a conventional inverter system for realizing the high-speed communications.

First of all, an arrangement of the inverter system of this embodiment will be explained with reference to FIG. 1 which shows a circuit arrangement of the inverter system of this embodiment. As shown in the drawing, an inverter system 1 includes an upper ECU 2 and an inverter 3 (indicated by a dotted line in the drawing). The inverter 3 includes a CAN transceiver 30, a communication microcomputer 31, a photo coupler 32, a motor control microcomputer 33, a gate driving circuit 34, and a switching element 35. The photo coupler 32 serves as the insulation signal transmitting means of the present invention.

The communication microcomputer 31 is connected via the CAN transceiver 30 to the upper ECU 2. The communication microcomputer 31 incorporates a CAN controller 310 that controls the CAN transceiver 30. The upper ECU 2, the CAN transceiver 30, and the communication microcomputer 31 are disposed at the low-voltage side of the insulation boundary (indicated by an alternate long and short dash line in the drawing). Namely, these electric components operate under electric power supply of a 12V low-voltage battery (not shown in the drawing).

The motor control microcomputer 33 is optically connected to the communication microcomputer 31 via the photo coupler 32. The gate driving circuit 34 and the switching element 35 are serially connected to a downstream side of the motor control microcomputer 33. The motor control microcomputer 33, the gate driving circuit 34, and the switching element 35 are disposed at the high-voltage side of the insulation boundary. Namely, these electric components operate under a 200V high-voltage battery 5. This high-voltage battery 5 is also usable as a power source for driving the automotive vehicle. The switching element 35 is connected to the motor 4.

The above-described inverter system of this embodiment operates in the following manner. Each instruction of the upper ECU 2 is transmitted to the communication microcomputer 31 via the CAN transceiver 30 according to the CAN protocol. The communication microcomputer 31 converts the transmitted instruction into the instruction compliance with a low-speed serial communication protocol having the communication speed of approximately 300 bps. The low-speed serial communication protocol is involved in the low-speed communication means of the present invention. The instruction converted by the communication microcomputer 31 is transmitted via the photo coupler 32 to the motor control microcomputer 33. The motor control microcomputer 33 also receives output signals of a voltage detecting section 36 and a current detecting section 37. The motor control microcomputer 33 controls the gate driving circuit 34 with reference to these signal values and the instruction sent from the communication microcomputer 31. The gate driving circuit 34 acts as a means for driving the gate of the switching element 35. The switching element 35 acts as a means for converting a direct current of the high-voltage battery 5 into a three-phase alternating current. The motor 4 is driven by the three-phase alternating current. The motor 4 drives the motor-driven compressor (not shown).

The inverter system of this embodiment brings the following effects.

According to the inverter system 1 of this embodiment, the communications between the upper ECU 2 and the communication microcomputer 31 are executed according to the CAN protocol. The communications between the communication microcomputer 31 and the motor control microcomputer 33 connected via the photo coupler 32 are executed according to the low-speed serial communication. In other words, the use of CAN protocol is limited a region including the upper ECU 2 and the communication microcomputer 31 only. Accordingly, the photo coupler 32 needs not to possess high-speed communication capability. Thus, the inverter system 1 of this embodiment is preferably used for the automotive vehicles positively using the CAN protocol.

Furthermore, according to the inverter system 1 of this embodiment, almost all of the electric components of the inverter 3 except for the communication microcomputer 31 and the CAN transceiver 30 are disposed at the high-voltage side of the insulation boundary and accordingly driven or actuated under electric power supply of the high-voltage battery 5. Hence, the wiring of the inverter 3 is simple.

Furthermore, the inverter system 1 of this arrangement includes no electric components dissected by the insulation boundary. Therefore, there is no necessity of providing a long spatial distance or creepage distance for assuring insulation. Furthermore, no expensive insulation components such as a high-speed photo coupler, a current sensor, and an isolation amplifier, are required. Thus, the inverter system 1 of this embodiment is compact and not expensive.

Furthermore, according to the inverter system 1 of this embodiment, the electric components disposed at the high-voltage side of the insulation boundary can be commonly used for various kinds of automotive vehicles irrespective of the communication means to be practically used. Accordingly, the inverter system 1 of this embodiment can reduce the manufacturing costs.

Although the detailed explanation is given for the inverter system of the present invention, the embodiment of the present invention is not limited to the above-described one and accordingly can be modified in various ways. For example, the above-described embodiment employs the photo coupler 32 functioning as the insulation signal transmitting means of the present invention. However, it is possible to use a pulse transformer or other device as the insulation signal transmitting means of the present invention. Furthermore, according to the above-described embodiment, the high-speed communication means is the CAN protocol and the low-speed communication means is the low-speed serial communication protocol. However, the high-speed communication means and the low-speed communication means are not limited to a specific combination and can be arbitrarily changed as long as the communication speed of the high-speed communication means is faster than that of the low-speed communication means.

As apparent from the foregoing description, the present invention provides an inverter system capable of realizing high-speed communications with a downsized body and the simplified wiring.

What is claimed is:

1. An inverter system equipped with an inverter, said inverter comprising:
   an upper ECU operating under electric supply of a low-voltage battery;
   a communication microcomputer receiving an instruction from said upper ECU;
   a motor control microcomputer receiving an instruction from said communication microcomputer;
   a gate driving circuit controlled by said motor control microcomputer; and
   a switching element driven by said gate driving circuit for converting a direct current of a high-voltage battery into an alternating current to drive a motor,
   wherein
   said upper ECU and said communication microcomputer are connected to each other via high-speed communication means to transmit instructions,
   said communication microcomputer and said motor control microcomputer are connected to each other via low-speed communication means to transmit instructions,
   an insulation boundary is defined between said communication microcomputer and said motor control microcomputer to isolate a low-voltage side electric component receiving electric power of said low-voltage battery from a high-voltage side electric component receiving electric power of said high-voltage battery, and
   insulation signal transmitting means is disposed on said insulation boundary to assure insulation and transmit signals.

2. The inverter system in accordance with claim 1, wherein said motor drives an electrically-driven compressor for an automotive vehicle.

3. The inverter system in accordance with claim 1, wherein said high-speed communication means has a communication speed exceeding 20 kbps.

4. The inverter system in accordance with claim 3, wherein said high-speed communication means is a CAN protocol.

5. The inverter system in accordance with claim 1, wherein said load control microcomputer, said gate driving circuit and said switching element are disposed in the high voltage area to receive the electric power of the second voltage battery.

6. An inverter comprising:
   a communication microcomputer receiving a first instruction transmitted from an external apparatus;
   a high speed communicator which sets a communication speed of the first instruction transmitted to said communication microcomputer at a first value;
   a load control microcomputer receiving a second instruction transmitted from said communication microcomputer;

a low speed communicator which sets a communication speed of the second instruction transmitted to said load control microcomputer at a second value lower than the first value;

a gate driving circuit controlled by said load control microcomputer;

a switching element driven by said gate driving circuit;

an insulator, serving as an boundary between said communication microcomputer and said load control microcomputer, which isolates an electric component of a low voltage area receiving electric power of a first voltage battery from an electric component of a high voltage area receiving electric power of a second voltage battery of which a voltage is higher than that of said first voltage battery; and an insulation signal transmitter, disposed on said insulator, which assures insulation of said electric component of said low voltage area from said electric component of said high voltage area, and through which the second instruction is transmitted.

7. The inverter system in accordance claim 6, wherein said load control microcomputer controls a motor through said gate driving circuit and said switching element, and said motor drives an electrically-driven compressor for an automotive vehicle.

8. The inverter system in accordance with claim 6, wherein said high speed communicator has a communication speed exceeding 20 kbps.

9. The inverter system in accordance with claim 8, wherein said high speed communicator in a CAN protocol.

* * * * *